United States Patent Office 3,701,796
Patented Oct. 31, 1972

3,701,796
STORAGE STABLE METHYLENEBIS (PHENYL ISOCYANATE) COMPOSITIONS
Nabil Najib Saaty, Palos Verdes Peninsula, and Richard Lee Jacobs, Hawthorne, Calif., assignors to The Upjohn Company, Kalamazoo, Mich.
No Drawing. Filed Sept. 29, 1970, Ser. No. 76,611
Int. Cl. C07c *119/04*
U.S. Cl. 260—453 SP
4 Claims

ABSTRACT OF THE DISCLOSURE

Methylenebis (phenyl isocyanate) is converted to a form which is a storage stable liquid even on exposure to temperatures as low as $-5°$ C. The storage stable composition comprises from about 85 to about 50 percent by weight of (a) the isocyanate obtained by heating methylenebis(phenyl isocyanate) with about 0.1 percent to about 3 percent by weight of a trihydrocarbyl phosphate at a temperature within the range of about 160° C. to about 250° C. and from 15 to about 50 percent by weight of (b) a dibenzoate of the formula

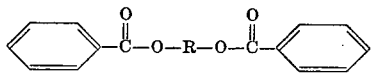

wherein R is the residue of an alkylene glycol or polyalkylene glycol.

The liquid isocyanate so obtained can be used for polyurethane syntheses for which the untreated methylenebis (phenyl isocyanate) is commonly employed.

BACKGROUND OF THE INVENTION

(1) Field of the invention

This invention relates to novel isocyanate compositions and is more particularly concerned with novel, storage stable, compositions derived from methylenebis(phenyl isocyanate), with processes for their preparation, and with polyurethanes derived therefrom.

(2) Description of the prior art

One of the diisocyanates commonly used in the preparation of both cellular and non-cellular polyurethanes is methylenebis(phenyl isocyanate). This material is available commercially either in substantially pure form or in admixture with related polyisocyanates having higher functionality. The latter mixtures are generally produced by phosgenation of a mixture of polyamines produced by acid condensation of formaldehyde and aniline; see, for example, U.S. Pats. 2,683,730; 2,950,263; and 3,012,008. Such mixed products containing methylenebis (phenyl isocyanate) are normally liquids at temperatures of 20° C. or higher. They therefore present no difficulties in handling or dispensing through conventional foam and elastomer formulation mixing machines.

Substantially pure methylenebis(phenyl isocyanate), on the other hand, presents a problem in that it is normally a solid at room temperature (circa 25° C.) having a melting point of the order of 35 to 42° C. This material has therefore to be melted and maintained in molten state in order that it can be transferred by piping and pumping arrangements normally employed in the preparation of polyurethanes.

In U.S. Pat. 3,384,653 there is described a method of converting methylenebis(phenyl isocyanate) to a liquid form which remains stable on storage at temperatures above about 15° C. The conversion is effected by heating the methylenebis(phenyl isocyanate) with from 0.1 percent to 3 percent by weight of a trihydrocarbyl phosphate at a temperature within the range of about 160° C. to about 250° C. Preferably the heating is continued until the isocyanate equivalent of the reaction mixture is within the range of about 130 to about 150.

The composition obtained in accordance with the aforesaid U.S. Pat. 3,384,653 is highly suitable for transfer as a liquid using conventional techniques and machinery for the preparation of polyurethanes. Said composition is highly satisfactory and retains its liquid state provided always that the environmental temperature to which it is exposed is not substantially below 15° C. It has been found, however, that said composition is still vulnerable to partial or total solidification if exposed for prolonged periods at temperatures below about 15° C. The frozen composition can be restored to its original liquid state by heating but this requirement adds substantially to the labor and overhead costs in the use of the material in the commercial preparation of polyurethanes.

We have now found that the stability, on storage at low temperatures, of the compositions of the aforesaid U.S. Pat. 3,384,653 can be extended to temperatures as low as $-5°$ C. by a process which will be described below. The advantages which flow from our finding will be readily apparent. Further the additional storage stability can be imparted to the isocyanate compositions without detracting substantially from the usefulness of said isocyanate compositions in the synthesis of polyurethanes.

SUMMARY OF THE INVENTION

This invention consists of an isocyanate composition which is a storage stable liquid at temperatures above about $-5°$ C., which composition comprises a mixture of (a) from about 85 to about 50 percent by weight of the product obtained by heating methylenebis(phenyl isocyanate) with about 0.1 percent to about 3 percent by weight of a trihydrocarbyl phosphate wherein hydrocarbyl is from 1 to 12 carbon atoms, inclusive, at a temperature within the range of about 160° C. to about 250° C. and;

(b) from about 15 to about 50 percent by weight of a dibenzoate of the formula:

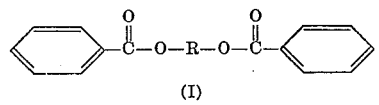

(I)

wherein R is the residue of a glycol selected from the group consisting of alkylene glycols, polyalkylene glycols, and mixtures thereof.

DETAILED DESCRIPTION OF THE INVENTION

The novel compositions of the invention are readily prepared by admixture of the separate components in the appropriate proportions. The admixture can be effected by any means currently employed in the art for blending two or more components. Advantageously, the admixture is carried out under conditions of temperature such that both components are freely flowing liquids. Adequate agitation during admixture ensures the production of a homogeneous mixture. Advantageously the dibenzoate of Formula I is substantially free from extraneous moisture at the time at which the blending with the isocyanate is accomplished. Preferably the dibenzoate of Formula I has a water content of less than about 0.03% by weight.

The modified methylenebis(phenyl isocyanate) which is employed as component (a) in preparing the novel compositions of the invention is prepared in accordance with the processes described and exemplified in the aforesaid U.S. Pat. 3,384,653. Advantageously, said modified methylenebis(phenyl isocyanate) has an isocyanate equivalent within the range of about 130 to 150. Preferably said modified methylenebis(phenyl isocyanate) has an isocyanate equivalent within the range of about 135 to 145.

The dibenzoates of Formula I which are employed as the component (b) of the novel compositions of the invention are a group of esters well-known and widely used in the art. These compounds are the dibenzoates derived from alkylene glycols and polyalkylene glycols by benzoylation of the glycol under conditions well-known in the art for benzoylation, e.g. by reaction of benzoyl chloride and the glycol in appropriate proportions in the presence of alkali in accordance with the conventional procedure of the Schotten-Baumann reaction (see Weygand, Organic Preparations, page 180, New York, 1945).

The alkylene glycols employed in the preparation of the dibenzoates (I) are preferably those containing from 2 to 8 carbon atoms, inclusive, including both straight and branched chain alkylene glycols.

Illustrative of such alkylene glycols are ethylene glycol, 1,2-propanediol, 1,3-propanediol, 1,4-butanediol, 2,3-butanediol, 1,5-pentanediol, 1,2-hexanediol, 1,3-heptanediol, 1,2-octanediol, and 1,8-octanediol. The polyalkylene glycols which are employed in the preparation of dibenzoates (I) are preferably the dialkylene glycols and higher polyalkylene glycols having a molecular weight from about 106 to about 320. The dialkylene glycols are generally obtained by reaction of an alkylene glycol, such as those defined above, with the appropriate alkylene oxide. Illustrative dialkylene glycols are diethylene glycol, dipropylene glycol, dibutylene glycol, 2-hydroxyethyl 2-hydroxypropyl ether, 2-hydroxypropyl 4-hydroxybutyl ether, 2-hydroxyethyl 8-hydroxyoctyl ether, 2-hydroxyethyl 2-hydroxyhexyl ether, and the like. The higher polyalkylene glycols are generally prepared by polymerizing the corresponding alkylene oxide such as ethylene oxide, propylene oxide, 2,3-butylene oxide, and the like, or the corresponding cyclic ethers such as tetrahydrofuran. Illustrative of the polyalkylene glycols are polyethylene glycol, polypropylene glycol, polybutylene glycol, poly(tetramethylene) glycol and the like, having molecular weights within the above specified range.

If desired, a mixture of two or more dibenzoates of Formula I can be employed in preparing the novel compositions of the invention provided that the overall proportions of dibenzoates to isocyanate component (a) is within the range specified above.

The novel storage stable liquid isocyanates of the invention can be used for all purposes for which methylenebis (phenyl isocyanate) can be used. Thus the isocyanates of the invention can be used in the preparation of a variety of polyurethanes, both cellular and non-cellular, which are presently prepared using methylenebis(phenyl isocyanate). Such polyurethanes include flexible, semi-rigid, and rigid foams, elastomers including fibers and filaments, sealants, coatings, supported and unsupported films, and the like.

The following examples describe the manner and process of making and using the invention and set forth the best mode contemplated by the inventors of carrying out the invention but are not to be construed as limiting.

EXAMPLE 1

The isocyanate component (a) was an isocyanate composition of isocyanate equivalent 143 obtained by heating methylenebis(phenyl isocyanate) with 1 percent by weight of triethylphosphate at 200° C. until the required increase in isocyanate equivalent was achieved, followed by cooling rapidly to room temperature. Eighty (80) parts by weight of this isocyanate were blended with 20 parts by weight of dipropylene glycol dibenzoate (Benxoflex 9-88; Velsicol) by stirring the two components at about 25° C. until a clear homogenous liquid was obtained. The liquid mixture so obtained was stored in a refrigerator at a temperature which varied over the range of −2° C. to −6° C. After storage for 3 weeks there was no evidence of deposition of solid in the mixture.

Similar compositions were prepared according to the above procedure of blending (i) 75 parts by weight of the above isocyanate and 25 parts by weight of the above dibenzoate and (ii) 70 parts by weight of the isocyanate and 30 parts by weight of the above dibenzoate. Both compositions were stored under the above cold storage conditions and neither showed any significant evidence of deposition of solids after storage for an extended period.

We claim:
1. An isocyanate composition which is a storage stable liquid at temperatures above −5° C., which composition comprises a mixture of
  (a) from about 85 to about 50 percent by weight of the product obtained by heating a methylenebis-(phenylisocyanate) which is normally a solid at about 15° C. with about 0.1 percent to about 3 percent by weight of a trihydrocarbyl phosphate wherein hydrocarbyl is from 1 to 12 carbon atoms, inclusive, at a temperature within the range of about 160° C. to about 250° C.; and
  (b) from about 15 to 50 percent by weight of a dibenzoate of the formula:

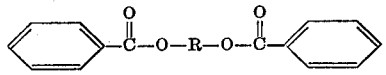

wherein R is the residue of a glycol selected from the group consisting of alkylene glycols from 2 to 8 carbon atoms, inclusive, polyalkylene glycols having a molecular weight from 106 to 320, and mixtures thereof.

2. An isocyanate composition according to claim 1 wherein the dibenzoate (b) is dipropylene glycol dibenzoate.

3. An isocyanate composition according to claim 1 wherein the isocyanate (a) has an isocyanate equivalent of about 143.

4. An isocyanate composition which is a storage stable liquid at temperatures above about −5° C., which composition comprises a mixture of
  (a) about 80 percent by weight of the isocyanate obtained by heating a methylenebis(phenyl isocyanate) which is normally a solid at about 15° C. with about 0.1 percent to about 3 percent by weight of triethyl phosphate at 160° C. to 250° C. until the isocyanate equivalent is approximately 143; and
  (b) about 20 percent by weight of dipropylene glycol dibenzoate.

References Cited
UNITED STATES PATENTS

| | | | |
|---|---|---|---|
| 2,865,774 | 12/1958 | Kampmeyer et al. | 260—476 X |
| 3,294,713 | 12/1966 | Hudson et al. | 260—453 X |
| 3,384,653 | 5/1968 | Erner et al. | 260—453 |
| 3,060,236 | 10/1962 | Kollar et al. | 260—465.9 X |
| 2,212,506 | 8/1940 | Bachman et al. | 260—485 |
| 2,734,074 | 2/1956 | Redmon | 260—486 |
| 3,089,898 | 5/1963 | Vitcha et al. | 260—486 |
| 3,089,899 | 5/1963 | Vitcha et al. | 260—486 |
| 3,089,900 | 5/1963 | Vitcha et al. | 260—486 |
| 3,089,901 | 5/1963 | Vitcha et al. | 260—486 |
| 3,089,902 | 5/1963 | Vitcha et al. | 260—486 |
| 3,100,795 | 8/1963 | Frantz et al. | 260—486 |
| 3,414,588 | 12/1968 | Jones | 260—593 R |
| 2,245,582 | 6/1941 | Gallagher et al. | 260—601 R |

LEWIS GOTTS, Primary Examiner

D. H. TORRENCE, Assistant Examiner

U.S. Cl. X.R.

260—2.5 AT, 77.5 AT, 453 AM, 476 R